July 28, 1936.  P. J. BERGGREN  2,049,041
MOTION PICTURE CAMERA
Original Filed June 4, 1929  12 Sheets-Sheet 1

Per Johan Berggren,
INVENTOR.

BY Darby & Darby
ATTORNEYS.

July 28, 1936.　　　　P. J. BERGGREN　　　　2,049,041
MOTION PICTURE CAMERA
Original Filed June 4, 1929　　12 Sheets-Sheet 2

Per Johan Berggren
INVENTOR.
BY
ATTORNEYS.

Per Johan Berggren.
INVENTOR.

July 28, 1936.　　　　P. J. BERGGREN　　　　2,049,041
MOTION PICTURE CAMERA
Original Filed June 4, 1929　　12 Sheets-Sheet 4

Per Johan Berggren
INVENTOR.

BY Darby & Darby
ATTORNEYS.

July 28, 1936. P. J. BERGGREN 2,049,041
MOTION PICTURE CAMERA
Original Filed June 4, 1929 12 Sheets-Sheet 7

Per Johan Berggren.
INVENTOR.
BY Darby & Darby
ATTORNEYS.

July 28, 1936.                P. J. BERGGREN                2,049,041
                           MOTION PICTURE CAMERA
                   Original Filed June 4, 1929   12 Sheets-Sheet 8

Per Johan Berggren
INVENTOR.
BY Darby & Darby
ATTORNEYS.

Per Johan Berggren.
INVENTOR.
BY Darby & Darby
ATTORNEYS.

July 28, 1936.   P. J. BERGGREN   2,049,041
MOTION PICTURE CAMERA
Original Filed June 4, 1929   12 Sheets-Sheet 10

Per Johan Berggren.
INVENTOR.
BY
ATTORNEYS.

Per Johan Berggren.
INVENTOR.
BY Darby & Darby
ATTORNEYS.

July 28, 1936. P. J. BERGGREN 2,049,041
MOTION PICTURE CAMERA
Original Filed June 4, 1929 12 Sheets-Sheet 12

Per Johan Berggren.
INVENTOR.
BY Darby & Darby
ATTORNEYS.

Patented July 28, 1936

2,049,041

UNITED STATES PATENT OFFICE 2,049,041

MOTION PICTURE CAMERA

Per Johan Berggren, New York, N. Y.

Application June 4, 1929, Serial No. 368,352
Renewed June 21, 1934

8 Claims. (Cl. 88—17)

This invention relates to motion picture cameras.

The object of the invention is to provide a motion picture camera, the structure of which is simple and efficient.

A further object is to provide means in a motion picture camera for efficiently and properly focussing the photographic lens, as well as the finder lens.

A further object is to provide means to counteract the offset relation of the finder lens with reference to the photographic lens.

A further object is to provide a motion picture camera, in which are produced pictures of larger area than are the pictures heretofore and ordinarily made for motion picture purposes, thereby securing an enlarged projection of the picture upon the screen thereby increasing the visibility of the projected pictures.

A further object is to provide an improved shutter structure and the operation thereof for motion picture cameras.

A further object is to provide an improved drive gearing structure for operating the shutters of the motion picture cameras.

A further object is to provide an improved control mechanism for the shutter drive gearing, whereby the degree of opening of the shutters may be adjustably varied and controlled manually as well as automatically.

A further object is to provide a shutter control mechanism which visually displays to the operator the relative relation of the shutters to each other at all times during the operation of the camera.

A further object is to provide safety devices for the automatic shutter control.

A further object is to provide an improved bearing structure for the shutter operating shafts to permit and facilitate rotative as well as end-wise sliding movement in either direction at the same time.

A further object is to provide a counter mechanism for accurately counting the number of pictures taken and also the footage of film consumed in the operation of the camera.

A further object is to provide an improved structure of film feed apparatus for motion picture cameras.

A further object is to provide improved means for accurately and uniformly positioning the film with relation to the aperture.

A further object is to provide means for adjusting the position of the film, or the portion thereof exposed to the aperture, with accurate correspondence and relation to the teeth of the film feeding sprocket.

A further object is to provide improved means in a camera to prevent outward bulging or movement of the film, or the portion thereof exposed to the aperture, during the time of the exposure and more particularly when employing films of extra or unusual width.

A further object is to provide an improved means to hold the film in position for exposure at the aperture.

A further object is to provide means to eliminate air cushion effects between the film and clamping plate used for securing the same in or over the aperture.

A further object is to provide a movement casing which is adjustable so as to adjust the movement mechanism with relation to the aperture and aperture plate.

A further object is to provide a camera adapted for use in connection with the taking of pictures of larger area than has heretofore been deemed desirable or practical.

A further object is to provide means for accommodating a surplus of film length between the aperture plate and the intermittent sprocket.

Other objects will appear more fully hereinafter.

The invention consists substantially in the construction, combination, location and relative arrangement of parts, all as will be more fully hereinafter set forth, and shown in the accompanying drawings, and finally pointed out in the appended claims.

In the accompanying drawings,—

The same part is designated by the same reference numeral wherever it occurs throughout the several views.

In my application for "Motion picture projecting apparatus", filed December 20, 1928, Serial Number 327,200, I have shown, described and claimed a motion picture projecting apparatus adapted for use in projecting pictures of enlarged area.

The present invention relates more particularly to a structure of camera suitable and adapted for taking pictures of enlarged area for use in said projecting apparatus, and for increasing the visibility and distinctness of the projected pictures, and of the figures and images composing the same, without impairing the photographic quality thereof. In the use of the projecting apparatus referred to, a film is employed which is of increased area or dimensions over films heretofore ordinarily employed in taking motion pictures. That is to say, the area of the portion of film on which the individual pictures are taken is of increased or greater dimensions than is the area of film ordinarily used or exposed in taking motion pictures.

It is among the special purposes of the present invention to provide a camera in which larger areas of film than heretofore employed are exposed in taking the individual pictures, although the principle of my invention may be equally well employed in connection with films of ordinary dimensions.

In employing films according to the practice heretofore commonly employed the usual dimensions of each individual picture have been three-quarters of an inch in height and one inch in width with sixteen exposures or pictures to each foot of film.

In the use of the camera embodying the principle of my present invention, I propose to employ an area of exposure of a film so as to produce therein a picture of one and one-eighth inches in height and two inches in width with sixteen exposures for each one and one-half feet of film, thereby securing a fifty percent increase in the height and one hundred percent increase in width of each individual picture, as well as an increase in footage of film of three-eighths of an inch for each exposure, thereby producing with the camera a greatly enlarged picture for each exposure, and hence securing the benefits and advantages of a greatly enlarged picture when projected on to the screen. This means a greatly increased visibility of the projected picture and increased distinctness of the figures and objects composing the same.

In carrying out my invention, in one form of embodiment thereof, I employ a casing indicated generally at 30, within which is mounted the shutters and their operating and controlling mechanism, the movement and its enclosing casing, and the film registering and clamping devices, and other features which constitute features of my invention.

Figure 1:
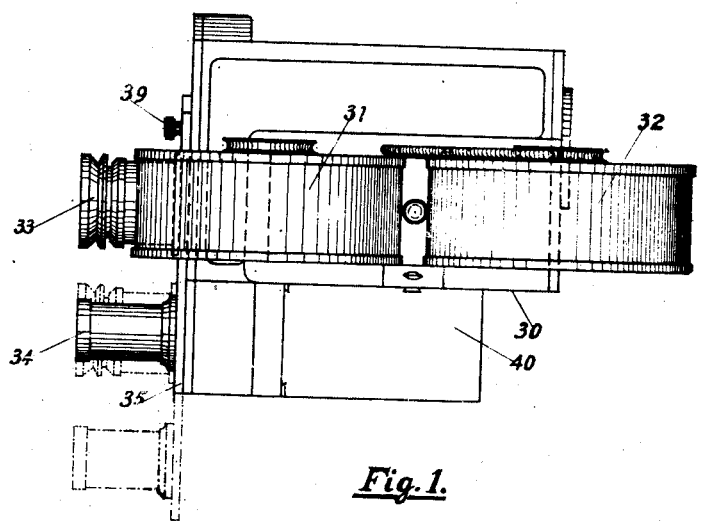
Figure 1 is a view in top plan of a camera embodying the principles of my invention, the positions of the photographic and finder lenses, when shifted, being indicated in dotted lines.
Figure 2:
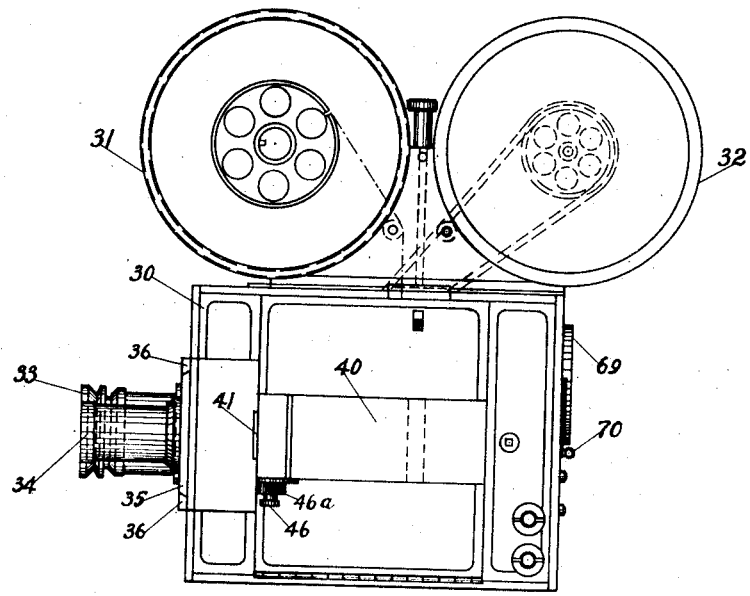
Fig. 2 is a view in side elevation of the same.

As shown in Figs. 1 and 2, the magazines 31, 32, are carried by a suitable supporting bracket mounted and clamped upon the top of the casing 30, in the usual or any suitable or convenient manner. The structure of magazine or film take up is shown conventionally, as these devices do not form any part of my present invention.

In the use of cameras for taking motion pictures, it is customary to employ a photographic lens and also a finder lens, the figure or scene to be photographed being located and focussed through the finder lens before the exposures are made with the photographic lens. It is necessary, however, that the photographic lens be focussed as accurately as the finder lens. To permit the proper focussing of the two lenses I propose, in accordance with my invention, to carry both lenses on a common support mounted to slide with reference to the casing of the camera, so that either one can be brought into alignment with the line of focussing sight of the operator, which, ordinarily, is disposed at one side of the normal line of the photographic lens. To accomplish this result, therefore, I provide for the shifting of the common support for the two lenses so as to bring first the finder lens into the proper focus and then can shift the photographic lens into the line of finder sight for corresponding focus adjustment. This may be accomplished in various ways.

Figure 8:
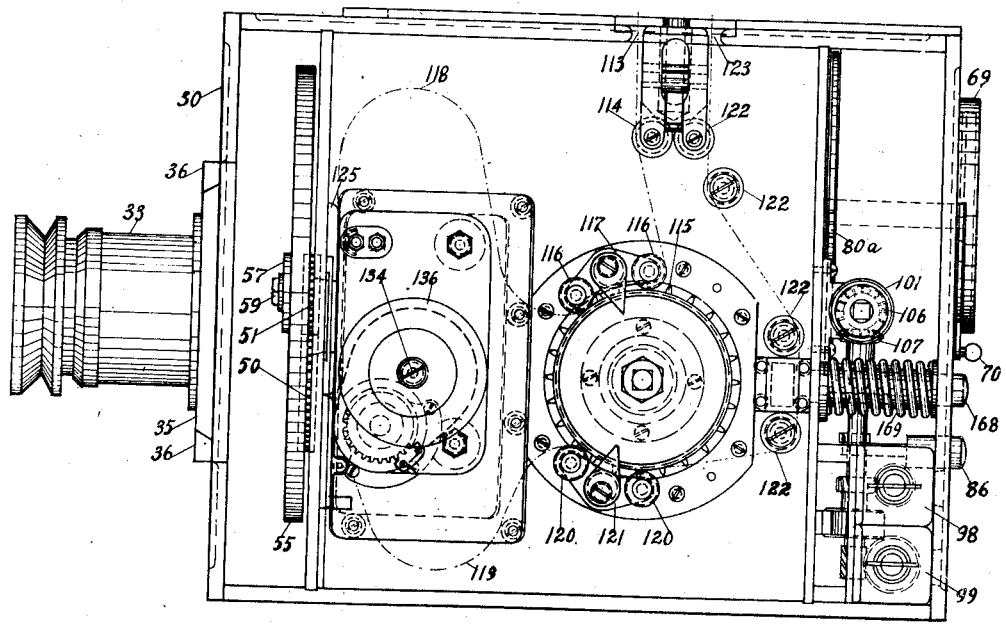
Fig. 8 is a view in side elevation of the film movement side of the camera, the side wall of the casing being removed.

I have shown a simple arrangement wherein the photographic lens 33 and the finder lens 34 are both carried upon a plate 35, see Figs. 1 and 2, which is mounted to slide transversely across the front end of the camera casing in guides indicated at 36, Figs. 2 and 8. Any suitable means may be provided for limiting the sliding movement of the lens carrier support 35.

Figure 3:
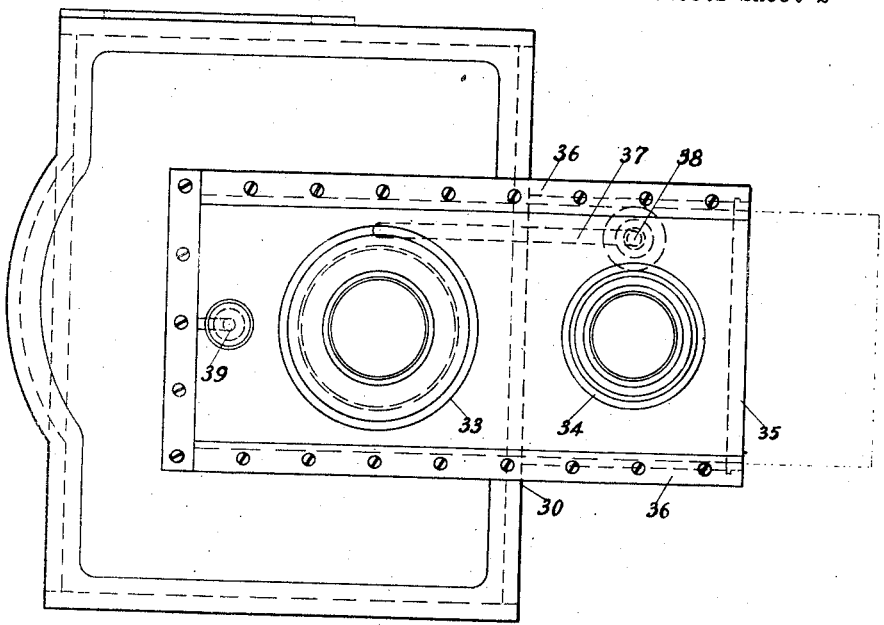
Fig. 3 is a view in front elevation of the same showing the slide plate carrying the photographic and finder lenses with its guide and limit stops indicated in dotted lines.
Figure 4:
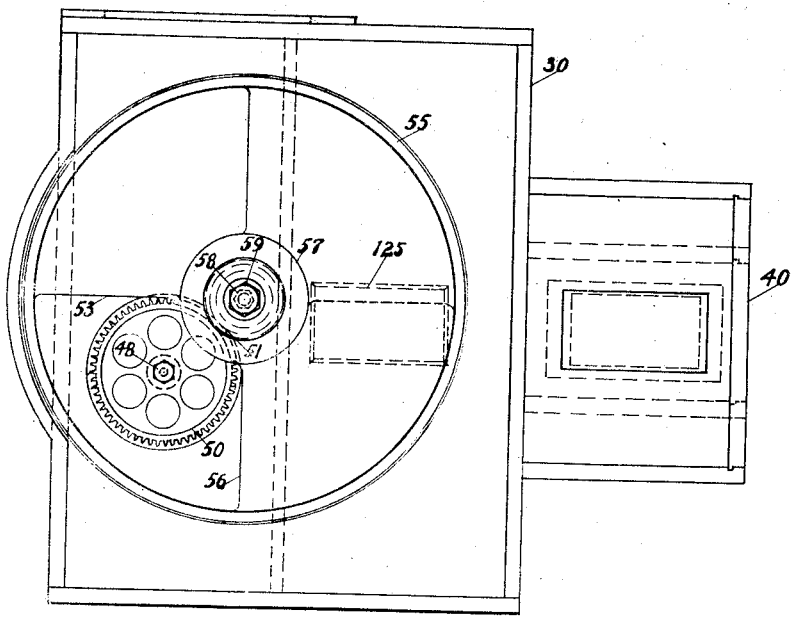
Fig. 4 is a view similar to Fig. 3 with the front plate of the casing removed to disclose the shutters and a portion of the gearing for driving the same.

A simple arrangement for accomplishing this result is shown wherein a slot indicated in dotted lines at 37, see Fig. 3, is provided in the support 35, which slot engages a detent device indicated at 38 mounted on a convenient adjacent part of the camera casing. The length of the slot 37 is such that when the detent 38 brings up against one end of said slot, the two lenses 33, 34, are in their relative positions for use, while pictures are being taken, and when the support 35 is drawn outwardly in its guides 36 till the other end of the slot 37 brings up against the detent 38, then the photographic lens 33 is brought into line with the line of sight through the finder box, as indicated for instance in dotted lines in Fig. 1. When the support 35 is in a position shown in Fig. 3 for use of the camera in taking pictures, said support may be solidly and tightly held in place in any convenient manner, as, for instance, by means of a screw or other lock device, indicated at 39. The finder box is indicated generally at 40, see Figs. 1, 2, 3 and 4.

It frequently becomes desirable to mask the aperture of the finder, as well as that of the photographic apparatus, and sometimes it is desirable to reduce the volume of light admitted to the photographic aperture in taking a picture. To accomplish this, I propose in accordance with my invention, to provide a slot or opening 41, see Fig. 2, which extends transversely across the front end of the finder box 40 and of the camera casing. This slot is adapted to receive a masking strip or light filtering strip, which, when inserted in said slot, will serve the purpose of masking the film and finder apertures or diffusing the light entering the finder box or the photographic aperture.

In the use of a motion picture camera, the object or scene to be photographed is ordinarily sighted by the camera operator through the finder box aperture. The line of vision of the object or scene through the finder box and lens, however, is at an angle to the line of exposure of the object through the photographic aperture and lens. This is due to the necessity for off setting the finder box to one side of the line of the photographic lens and aperture. It is important, in the use of a camera, to bring the image in the finder into equal framing space and relation with respect to the image of the photograph lens. This is particularly true in the case of close-up work; that is in the case of taking pictures of objects, scenes, or images, at a distance of from say ten to fifty feet away from the camera.

To compensate and counteract for the inclined or tangential position of the finder lens with relation to the actual position of the photographing lens during the time of use of the camera, I provide means for adjusting the image framing of the finder box.

Figure 6:
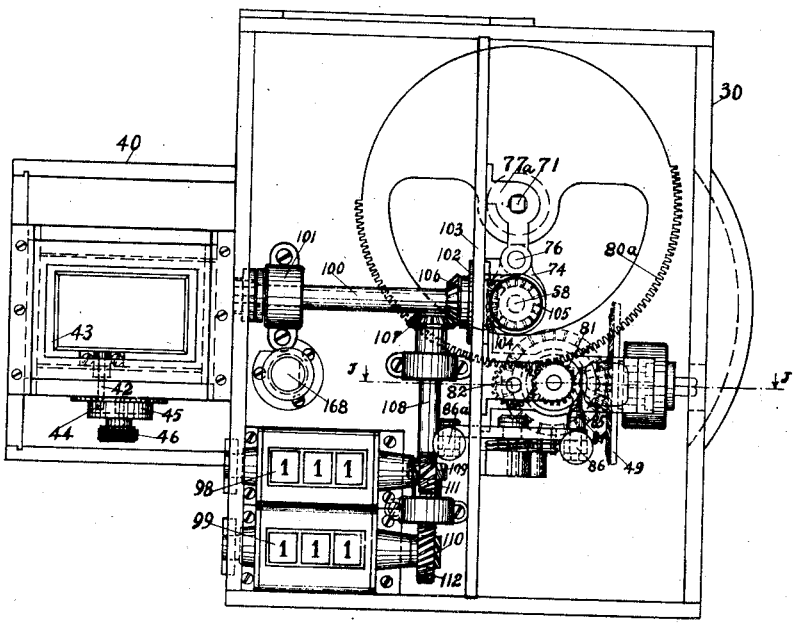
Fig. 6 is a view similar to Fig. 5 with the rear casing plate removed to disclose the gearing.

In Fig. 6, I have shown an arrangement for effecting the compensation referred to. As shown a pin indicated at 42 is connected to the image frame 43 of the finder, and extends through a slot or opening in the wall of the finder box, the protruding end of the pin extending into a cam slot indicated in dotted lines at 44, formed in a rotatively movable member 45. The knurled nut 46 may serve for rotatively actuating or moving the cam member 45. By suitably rotating the cam member 45, the image framing member 43 of the finder may be adjusted so as to bring the position of the image in the finder into proper framing relation with respect to the line of exposure of the image or object to be photographed through the photographic lens. If desired, a suitable scale may be engraved or otherwise applied to the cam member 45 to facilitate the adjustment of the finder frame to any particular distance away of the camera from the object or image to be photographed, as indicated at 46ª Fig. 2.

I will now describe a shutter mechanism embodying the principles of my invention, including operating devices, drive gearing therefor, and the control for such gearing, the general object and purpose being to provide a most efficient and accurate shutter mechanism of simple structure capable of being easily assembled together, with a novel arrangement of drive gearing for operating the shutter members, and the provision of control mechanism by which the relative positions of the shutter members may be adjusted and maintained, either manually or automatically, to vary the area of shutter opening as exigency of use may require, as well as the duration of the shutter opening, and/or of the closure of the shutter opening. In carrying out this part of my invention, I employ a main operating shaft indicated at 47, which is suitably mounted within the camera casing 30 and adapted to be driven, either manually or by motor, as may be desired. In the particular arrangement shown, to which, of course, my invention is not to be limited or restricted, the main shaft 47 extends transversely within the camera casing 30. Mounted within the casing is a longitudinally extending shutter operating shaft 48, which is suitably geared to and driven from the main shaft 47, as for example by means of the intermeshing gears 49, see Figs. 9 and 10. Carried by the shaft 48 is a spur gear 50, which is mounted upon the end of said shaft 48, and which meshes with and drives a gear member 51 mounted upon a reduced portion of a tubular shutter operating shaft 52. Suitably mounted upon the gear member 51 is the shutter member 53 which I would refer to as the inner shutter member. The mounting of this shutter member or disk upon the gear member 51 may be effected in many different ways. I have shown a simple, efficient and compact arrangement wherein the central hub portion of the inner shutter 53 is shown thickened or enlarged as at 54 and is received upon a short inner hub extension of the gear member 51, as clearly shown in Fig. 9. The outer peripheral edge of the inner shutter member 53 is engaged in an annular ring member 55 which serves to receive and hold the shutter against displacement or bulging, and also as a balance member for the inner shutter disk. The peripheral edge of the shutter member 53 may be conveniently swaged into an annular groove formed in the inner surface of the ring member 55. The hub ring, 54, of the inner shutter member 53, may, of course, be secured in its mounted position upon the gear member 51 in any suitable or convenient way, as by means of rivets or otherwise. The outer shutter disk member 56 is suitably secured to a cap member 57, which is mounted upon to rotate with a shaft 58, which extends longitudinally through the tubular shaft 52, and which is driven through gearing from the main shaft 47 as will be more fully hereinafter described. The cap member 57 is held between a screw head 59 and gear member 51. If desired a lock nut 60 may be interposed between these members 57, 51, to serve as a retainer for holding the gear member 51 against its bearing shoulder on the shaft 52, or the adjacent ball bearing 61 for the shaft 52.

As shown the two shutter disks 53, 56 are each in the form of a segment which extends through an annular space or distance of 180°, and as usual, these disks are so relatively arranged and operated that their cut-away portions are brought into register with each other across the line of exposure to the film through the photographic lens.

In order to secure the best results in the operation of the shutters under varying conditions encountered in the use of motion picture cameras, it is exceedingly desirable to provide means whereby the shutters are rotatively adjustable relatively to each other with great accuracy, so as to vary the area of the registering openings therethrough, and hence varying the duration of the exposures. The simple and accurate control of this adjustment in motion picture cameras is of exceedingly great importance.

Figure 9:
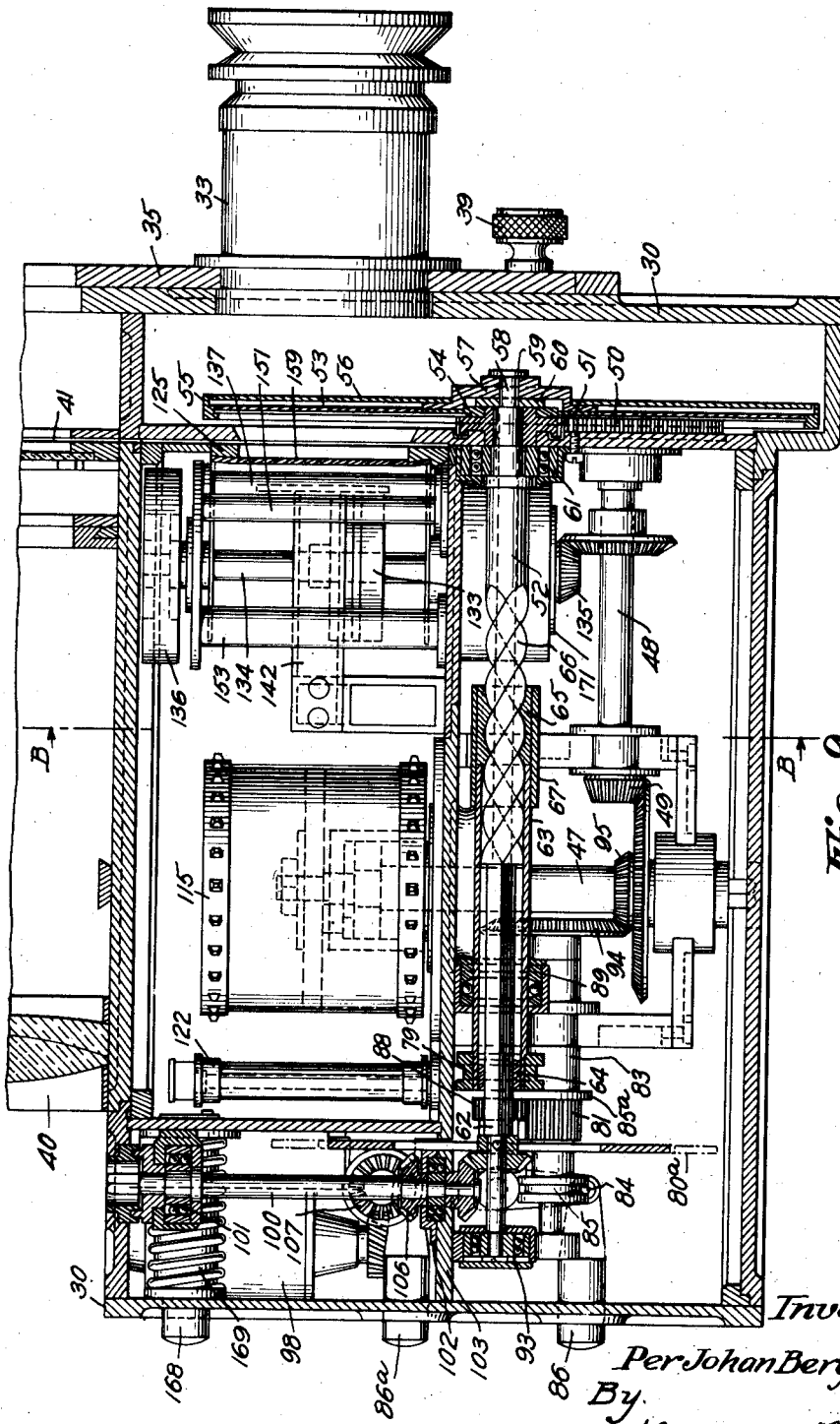
Fig. 9 is a view in horizontal section on the line A, A, Fig. 10, looking in the direction of the arrows.
Figure 10:
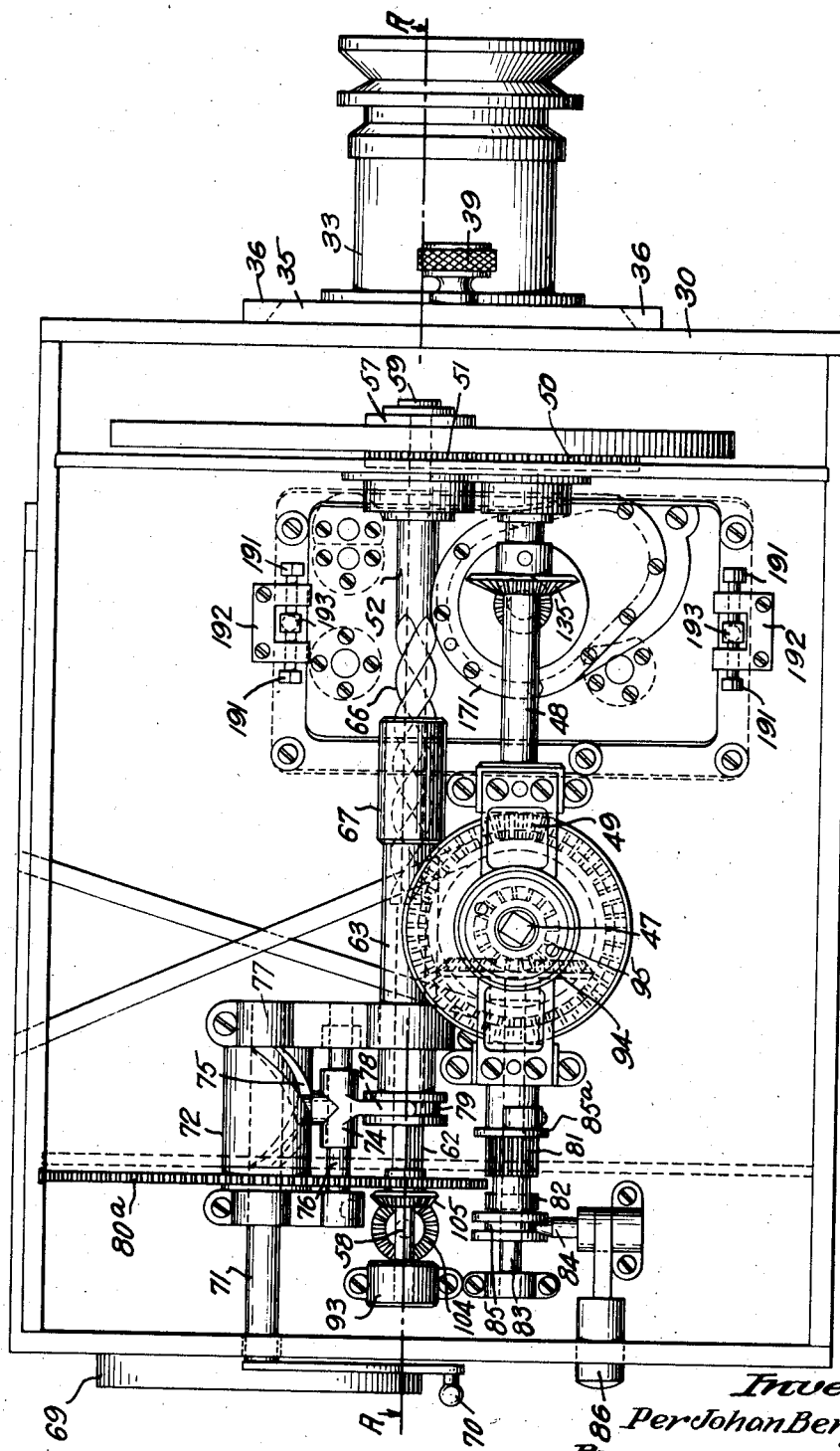
Fig. 10 is a view similar to Fig. 8 of the opposite side of the camera, the casing wall being removed showing the gearing and control mechanism for the shutters.
Figure 12:
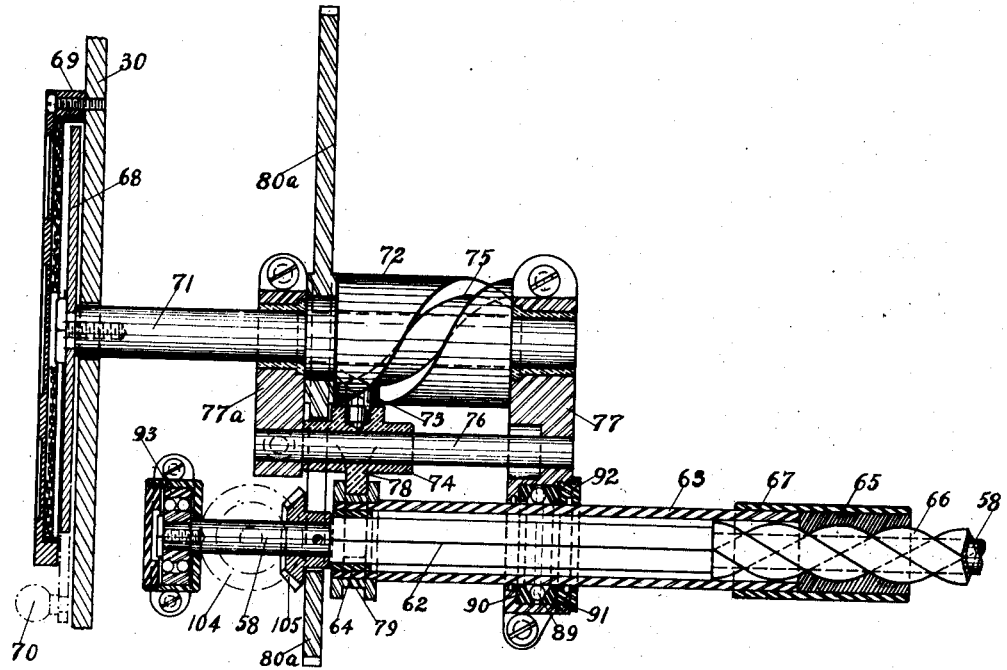
Fig. 12 is a broken detailed view in section showing a portion of the shutter control mechanism.

For rotatively actuating the shaft 58 which carries the outer shutter disk 56, I extend the inner end of said shaft 58 through and beyond the inner end of the outer shutter shaft 52, as indicated at 62, Figs. 9 and 10. Upon this extended portion of the shaft, which, in the form shown, is preferably square, I mount the longitudinally movable sleeve member 63 carrying at one end a square nut 64 which engages the square cross section portion 62 of said shaft 58. The opposite end of the sleeve 63 carries a spiral nut 65 which embraces a spiral portion 66 formed in the exterior surface of the hollow shaft 52, see Figs. 9, 10 and 12. The sleeve 63 is mounted for axial rotative movement, as well as longitudinal sliding movement. From this construction it will be seen that when the shaft 66 is rotated the sleeve 63 will rotate with it, and therefore will not be displaced longitudinally. When however, the sleeve 63 is shifted longitudinally in one direction or the other by reason of the engagement of the spiral nut 65 with the spiral formation 66 of shaft 52, said shaft will be rotatively shifted or moved, thereby rotatively displacing the inner shutter member 53 correspondingly and with relation to the outer shutter member 56.

When shaft 58 is rotated the sleeve 63 will be rotated without however, rotating the nut 65 since said nut is carried within a sleeve coupling 67, within the open end of which the sleeve 63 extends; but the sleeve 63 will be rotated by reason of the engagement of the square nut 64 with the square portion 62 of shaft 58, thereby rotating the two shutter members coincidentally.

Figure 13:
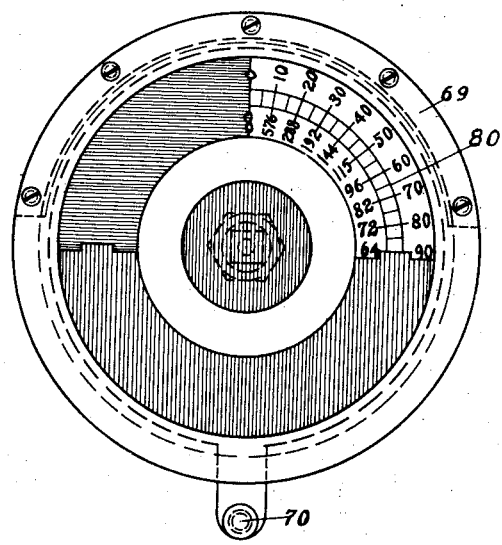
Figs. 13 and 14 are detailed views in elevation, of the tell-tale or dial indicators for indicating the relative adjustments of the shutters.
Figure 14:
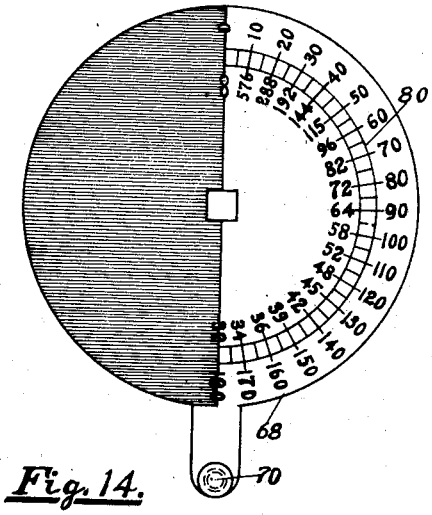
Figure 15:
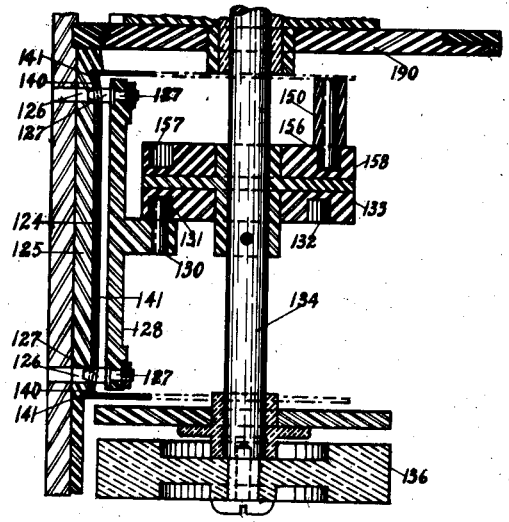
Fig. 15 is a view in section on the lines C, C, Fig. 18, looking in the direction of the arrows.

The relative rotative adjustment of the two shutter members is effected through the longitudinal shifting movements of sleeve 63. This sleeve may be adjusted longitudinally in many different ways, the purpose of the longitudinal adjustment being to relatively position the shutter disks with reference to each other, so as to effect the desired degree of opening of the shutter from zero degrees up to the maximum of 180°. I have shown one form of control of the longitudinal position of sleeve 63 which is effected by manual operation, through a rotatively displaceable hand operated setting disk 68. This setting disk is carried within a casing 69, suitably mounted upon the casing exteriorly thereof, see Figs. 12 and 13. The setting disk 68 is provided with an operating knob or handle 70, by which it may be rotatively displaced. The setting disk is mounted upon a shaft 71 which extends through the wall of the camera casing and on which is mounted a cam sleeve 72. A roller or other suitable device 73 carried by sleeve 74 is arranged to engage within the cam slot 75 of the cam sleeve. This cam slot, when said sleeve 72 is rotated, will cause the sleeve 74 to travel back and forth along its supporting stud shaft 76, said stud shaft being suitably mounted in supports 77, 77ª mounted within the camera casing. The sleeve 74 is provided with an extension which works within an annular groove in a spool 79 mounted upon the end of sleeve 63.

By this arrangement when the setting disk 68 is rotatively adjusted the sleeve 63 will be shifted or moved endwise in one direction or the other according to the direction of rotative adjustment of said disk. If shifted in one direction or the other, said sleeve will effect a rotative displacement of shaft 52 with relation to the shaft 58, thereby varying correspondingly the area of shutter opening, the opening being increased when the sleeve 63 is shifted in one direction, and decreased when shifted in the other direction.

It is desirable and important to provide means whereby the camera operator may constantly be apprised of the relative positions of the shutters; that is, of the area of opening afforded by the shutters. To accomplish this result, I associate with the setting disk 68, a dial arrangement having suitable graduations as indicated at 80, which, by reason of the position of the setting disk 68, reveals to the camera operator at all times not only the extent of relative adjustment of the shutters, but also the duration to the actual fraction of a second of each individual exposure. The outer graduations of the dial are provided to indicate the arc of the shutter opening, while the inner ring of graduations indicate the duration of the individual exposures. I prefer to employ black and white surfaces in connection with the indicating device, the dial graduations being formed on the white surface and being carried by the setting disk 68 will be exposed to the cameraman, the white surface of the indicator corresponding to the actual shutter opening. This gives the operator a visual image indicating the exact relation to each other of the shutters at all times.

Figure 32:
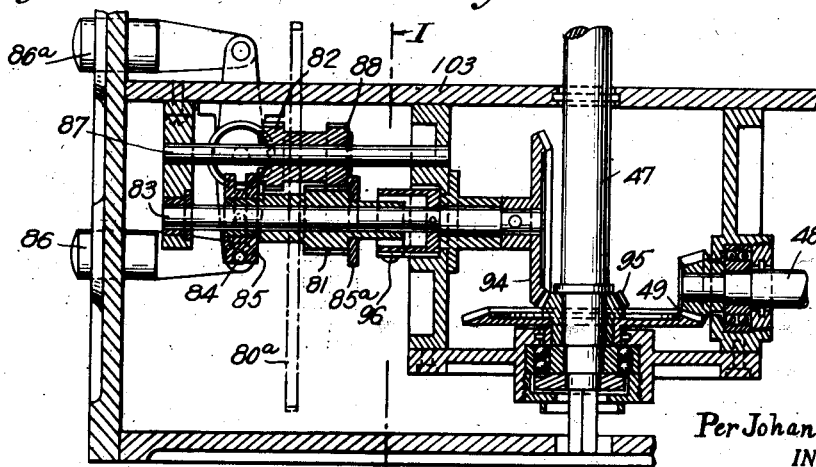
Fig. 32 is a broken detail view in section on the line J, J, Fig. 6, through the shutter control mechanism.

It may sometimes be desirable to effect the shifting of the position of the sleeve 63 automatically, the automatic operation however, being under the control of the operator. I have shown a simple arrangement for accomplishing this result wherein I mount upon the shaft 71 a spur wheel 80ª, of large diameter, which is adapted to be engaged and driven by one or the other of two gear wheels 81, 82 which are driven in reversed directions, according to whether the one or the other of them is shifted into engaging or meshing relation with respect to stud gear wheel 80ª. The gear 81 is sleeved upon to rotate with, but capable of sliding longitudinally of the shaft indicated at 83, and said sleeve is shiftable by means of a pin or stud 84, see Figs. 10 and 32 engaging in an annular groove of a collar 85 carried by the sleeve of gear 81. The pin 84 is arranged to be shifted as occasion may require from the exterior of the camera casing as, for example, by means of one or the other of push buttons 86, 86ª against the action of a suitably disposed spring which normally retains the drive gears 81, 82 in neutral or idle position with reference to 80ª. When, however, push button 86 is pressed inwardly the sleeve of gear 81 and the sleeve of gear 82 will be shifted so as to cause gear 82 to mesh with and drive gear 80ª. When push button 86ª is pressed inwardly the parts mentioned will be shifted towards the left as viewed in Fig. 32 so as to cause gear 81 to mesh with and drive gear 80ª in the opposite direction. In Fig. 10, the parts are shown in normal or neutral position, that is, in the position in which neither of gears 82, nor 81 are meshed with the gear 80ª. The gear 82 is carried to slide upon a short stud shaft 87. The sleeve which carries the gear 82 carries also a gear 88, which remains in constant mesh with gear 81 and is driven thereby but in reverse direction from that in which gear 81 is driven. The bracket formed by the side plates or collars 85, 85ª, engage the ends of the sleeve gear 81, 88, thereby causing all these parts to move together as a unit when one or the other of the buttons 86, 86ª is pushed inwardly. When either of the buttons is released after being depressed, the gear 82, or gear 81, is shifted back into normal, neutral position with reference to gear 80ª. The gear 82 is constantly driven by reason of the meshing of gear 81 in either of its positions with the gear 88, which is connected to sleeve carrying gear 82. The gear 81 is of sufficient axial length to permit the retention of the meshing together of gears 81 and 88.

It will be observed that the gear 80ª is a segmental gear, see Fig. 6, that is to say, the gear teeth formed on this gear occupy only a segmental portion of the periphery of the said gear. The purpose of this is that this gear is intended to actuate the cam sleeve 72 through only one rotation in one direction or the other, or possibly less than one complete rotation, to effect a longitudinal movement of sleeve 63 to the respective limits of such movement in opposite directions. The teeth of gear 80ª are omitted at the extremities of the sector portion of said gear, so that when the sleeve 63 is controlled automatically through the operation or control of push button 86, 86ª, and the gearing controlled thereby, and when the sleeve 63 reaches the limit of its control, the gear teeth of gear 80ª will have passed the point where driving connection is effected with gears 82, 81 and the longitudinal adjusting movement of sleeve 63 will be arrested.

It is important to eliminate or reduce the friction as much as possible of the rotative and longitudinal movements of the sleeve 63 in order to secure a smooth, easy operation of the shutter control devices. This can be accomplished in many different ways. A simple arrangement is shown, see Figs. 9 and 12, wherein a ball bearing structure indicated generally at 89 is provided within which the sleeve 63 is permitted to rotate and through which the said sleeve is permitted to slide. This ball bearing device, see particularly Fig. 12, consists of ring members 90, 91, mounted in a recess formed in supporting bracket 77, and held therein by means of a threaded cap member 92. The bearing rings 90, 91 have plane inclined surfaces on their opposed or proximate faces, thereby forming an equilateral triangular raceway, within which the antifriction bells of the bearing are held. The result of this structure is to provide three bearing surfaces or points of contact for each ball of the ball bearings.

I prefer to form the opposed faces of the bearing rings with an inclination of approximately 60°. The three contacts provided for each ball are, respectively, one on each ring and one on the sleeve; the contacts on the rings being on the inclined faces of said rings. These three contact points of course, are spaced 120° apart. This structure secures a most efficient anti-friction bearing not only for the rotative movement of the sleeve, but also for the sliding movements thereof. These sliding movements or rotative movements are in one direction or the other, and avoids any possibility of causing or permitting jamming of the balls. Other and ordinary ball bearings may also be provided for the shafts 58 and 52. I have already referred to one of said bearings as indicated at 61 for the outer end of the shaft 52. A similar ball bearing support is shown at 93 for the inner end of the shaft 58. These several bearings 61, 89 and 93 afford ample support for the shafting of the shutter control mechanism.

It will be understood that the spiral nut 65, as well as the square nut 64 will serve the purpose of supporting bearings for the shafts 58, 52 and that the outer shaft 52 will serve as a supporting bearing for the inner shaft 58. This makes a very efficient and effective bearing structure for said shafts.

Figure 33:
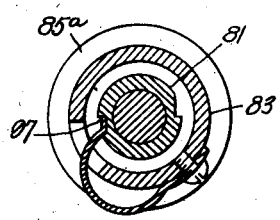
Fig. 33 is a view in section on the line I, I, Fig. 32.
Figure 23:
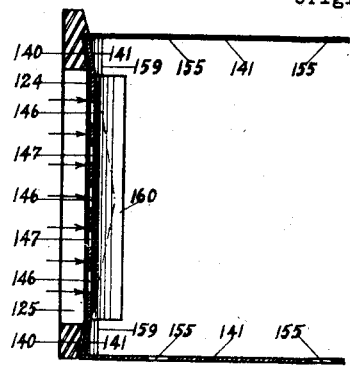
Fig. 23 is a detailed view in section, on the line E, E, Fig. 26, illustrating the relation of the aperture plate, the film, and the film clamping plate, in clamping relation with respect to each other.

It may happen that the automatic shutter control mechanism will get out of working order by reason of the gears jamming or getting broken, or otherwise. Should such an exigency arise, it is important to provide means whereby the camera is not entirely put out of commission. In accordance with my invention, therefore, I propose to provide means whereby in case of jamming or other derangement of the automatic shutter control devices, the same may be disconnected leaving the shutter control free to be adjusted and operated manually through control handle 70 and control disk 68. In one form of the apparatus for accomplishing this, see Figs. 32 and 33, wherein provision is made for driving the gear 81, or the sleeve which carries it, by means of a ratchet clutch consisting of a bow-spring 96 fastened at one end to a convenient part of the driven shaft member 83 and having its free end extending into engagement, in the manner of a pawl, with a shoulder 97 on the sleeve which carries the gear 81. Thus I provide a safety arrangement by means of which the gear 81 is driven through the spring 96. In case of jamming of the gearing referred to, all that is necessary to be done is to remove the bow spring 96, thereby throwing out of commission the automatic shutter control mechanism but the manual shutter control device remains in complete working operation.

In the operation of cameras it is desirable to register the number of pictures taken and also the footage of film used.

Figure 5:
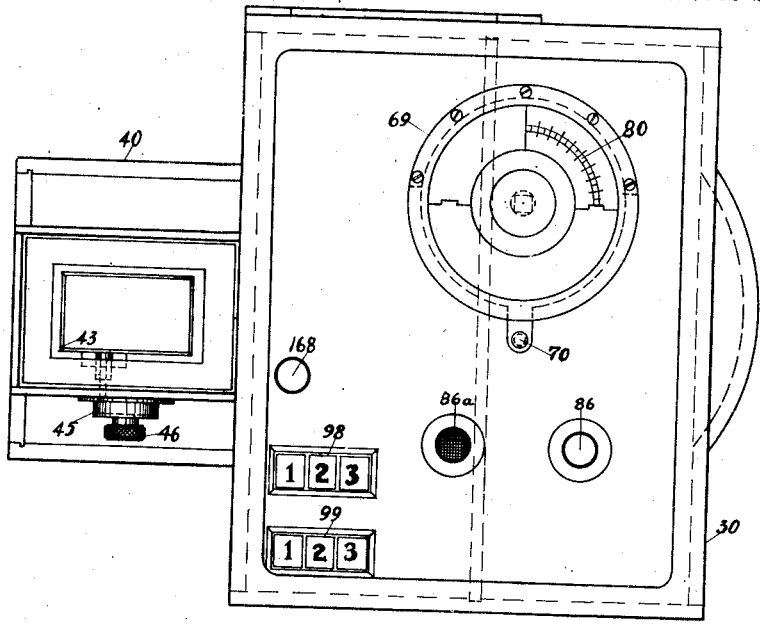
Fig. 5 is a view in rear elevation of the camera.

I have shown a counter or register mechanism wherein two registering devices are mounted within the casing. The registering device 98, see Fig. 6, constitutes a counter for the individual pictures taken, while the register device 99 constitutes a counter for the footage of film employed. These devices are disposed within the casing 30 of the camera so that counter wheels may be disclosed through openings or windows in the casing, as clearly indicated in Fig. 5. Standard forms of counter devices may be employed and as such structures are well known and form no part in themselves of my present invention, I have not shown the details thereof.

The counters may be driven or actuated by any suitable arrangement of drive gearing or mechanism. In practice I prefer to drive the counters through gearing from the drive shafts of the shutter devices, while at the same time providing for the manual resetting of the counters. To this end provision is made for actuating the counters in resetting from a point exteriorly of the camera casing.

I have shown a simple arrangement of gearing for actuating the counters consisting of a shaft 100, which is mounted in bearings 101, 102, see Figs. 6 and 9. The bearing 102 is carried by a partition plate 103 of the casing. The bearing 101 is mounted in a bracket secured to a convenient wall in the camera. The outer end of shaft 100 is made accessible from outside of the casing for manual actuation when required. Mounted upon shaft 100 is a gear wheel 104 with which meshes the drive gear 105 carried by inner shutter shaft 58 (see Figs. 6 and 12). Connected to and driven by gear 104 is a bevel gear 106 also mounted on shaft 100, which, in turn, meshes with and drives a gear 107 on a counter shaft 108. This counter shaft carries spiral gears 109, 110. The spiral gear 109 meshes with and drives a spiral gear 111 on the counter device 98, while the spiral gear 110 meshes with and drives a spiral gear 112 on the actuating shaft of counter 99. For the individual picture counter 98, the ratio of gears 109, 111, is 1 to 1, so that each separate picture is registered on counter 98 for each complete actuation of the apparatus. Where sixteen pictures are made on each foot and half length of film, that is, where unusually large pictures are made as hereinbefore described, the gear ratio between the gears 110, 112 is 3 to 32 for the film footage counter device 99. This structure, arrangement and gear ratio, insures an accurate count for each individual picture taken and also for the footage of film used, whether the apparatus is operated from the main power shaft 47 or whether it is operated through shaft 100.

I will now describe the arrangement of the film feeding mechanism and associated devices.

Figure 7:
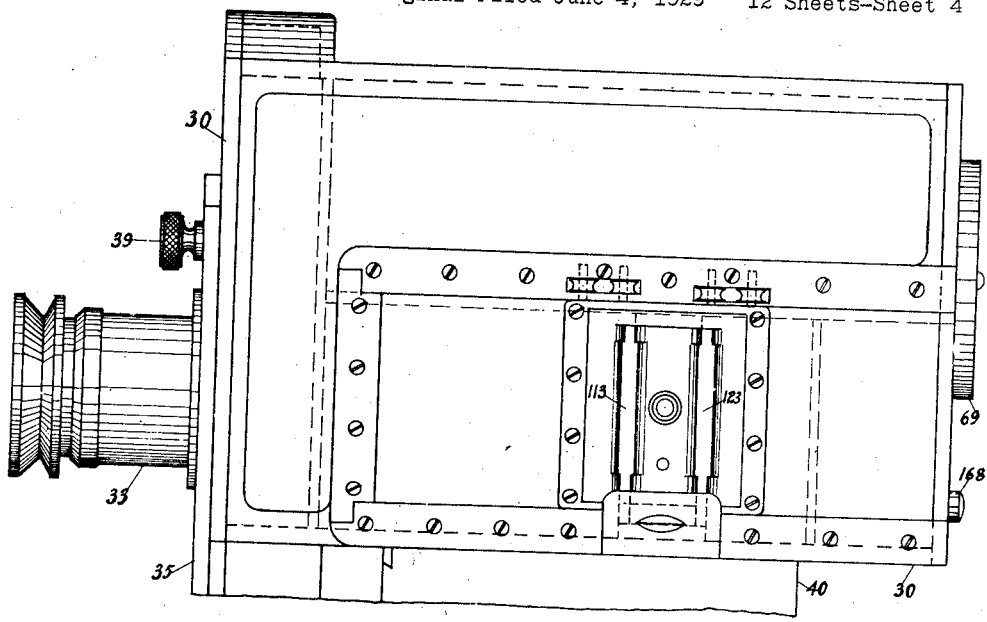
Fig. 7 is a view similar to Fig. 1, somewhat enlarged, with the film magazine removed.

In Fig. 8, I have indicated by dotted lines the course taken by the film when threaded through a camera from the carrying reel magazine 31 to the take-up reel magazine 32 (see Fig. 1). The film from the carrying reel passes from the magazine 31 through the slot of opening 113, (see Figs. 7 and 8), and inside the casing passes over a guide roller 114, thence to and partially around the main film feed sprocket 115, being held to the sprocket by guide rollers 116, carried by an eccentric actuated bracket 117. From the main film feed sprocket 115, the film is formed into the usual upper loop indicated at 118, thence passes across the aperture, and is then formed into the lower loop indicated at 119, thence again to and partially around the main film feed sprocket 115, being held thereto by the rollers 120, carried in an eccentrically mounted bracket 121. Thence the film passes around the train of guide rolls 122, and out through the casing slot 123 to the take-up reel. The structure of main feed sprocket 115 and the holding rolls 116, 120 and brackets 117, 121 associated with said sprockets may be of any suitable structure. The arrangement shown is one of a well known type and arrangement and the details thereof form no part of my present invention.

It will be understood that the film is fed through the camera by any suitable or well known type of film feeding mechanism. I have shown an ordinary type of intermittent movement 170, which is actuated by the usual star and driver mechanism contained in a casing 171, and driven by gearing 135, see Figs. 10 and 18.

Figure 11:
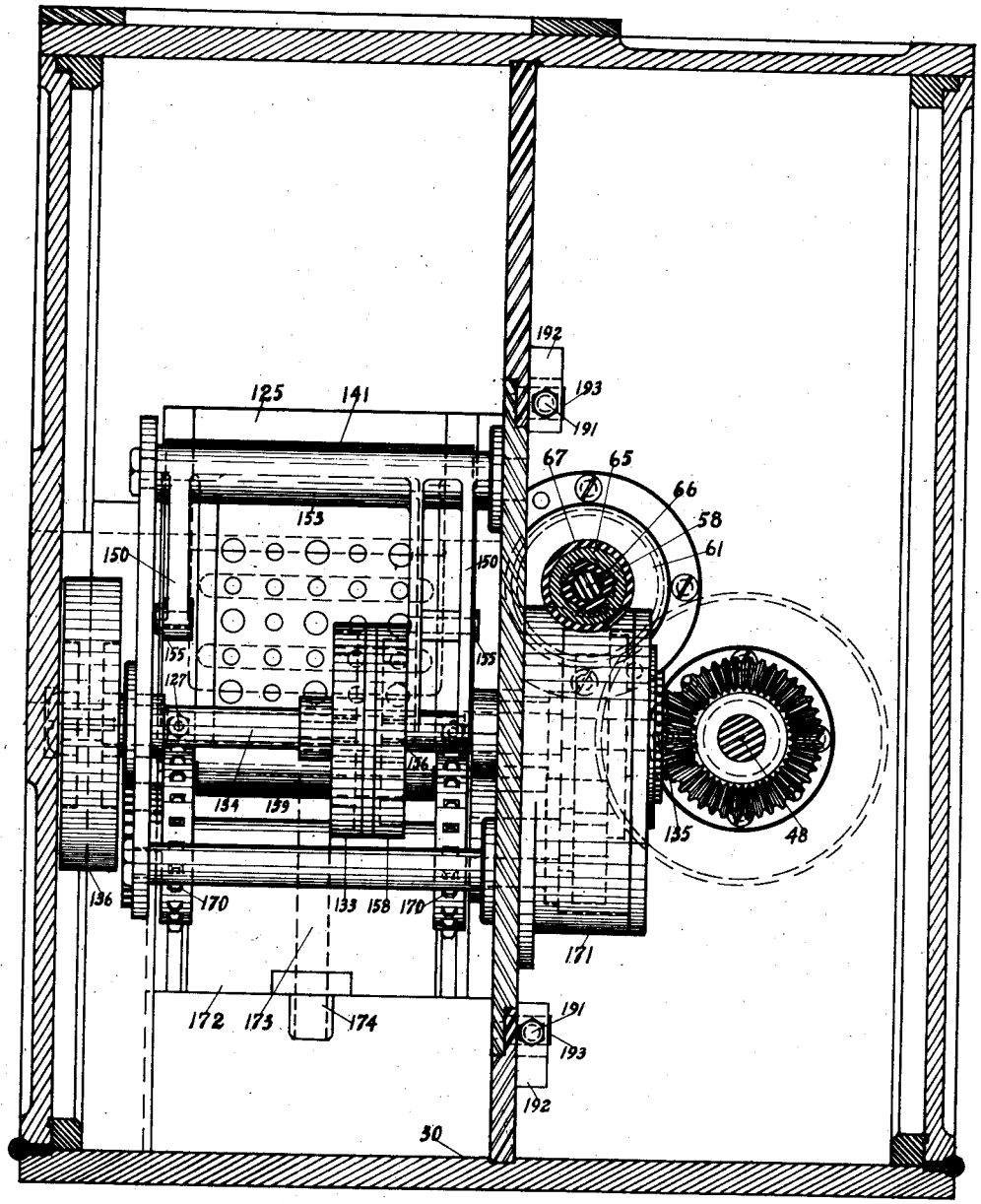
Fig. 11 is a view in vertical transverse section on the line B, B, Fig. 9 looking in the direction of the arrows.

It is desirable to facilitate the threading of the film around and to efficiently hold it upon the intermittent sprocket 170. To accomplish this I provide a shiftable guide plate 172, which is mounted to slide in suitable guides found in the camera casing at a point opposite the intermittent sprocket. This guide plate, when in raised position serves to hold the film in engagement with the teeth of the intermittent sprocket. For this purpose a presser roller 177 is mounted upon the guide plate and the film passes between this roller and the sprocket. In order to initially thread the film over the sprocket the guide plate 172 is lowered so as to afford space for the film to clear the sprocket teeth. When the film is passed partially around the sprocket with the sprocket teeth properly engaging in the perforations of the film, the guide plate is raised into its normal position thereby bringing the roller into position to press and hold the film in its engagement with the sprocket. This guide plate is retained in its raised position by a detent 174, carried by a spring 173, see Figs. 11 and 18.

As I have hereinbefore mentioned it is of great importance to accurately position the film with relation to the aperture plate and aperture, and to uniformly adjust or center the film with relation to the aperture, and when so adjusted and centered it is important to provide means for efficiently and rigidly clamping the film in its adjusted and centered position in the aperture frame. The tendency of the film to bend or bulge when its edges are clamped to the aperture frame and occupies a centered position across the aperture, is a fact which is well recognized in the operation of motion picture cameras. When it is realized that the centering or automatic adjustment of the film, as well as the clamping and releasing action, must be accomplished for each successive exposure of the film through the aperture, that is, for each picture to be taken, it will be understood that any derangement of the film out of uniform registering position for each successive picture, and any derangement occasioned by the film bulging transversely of its width, becomes a serious defect endangering the proper focussing of the camera with respect to the film, and impairing the results of the exposure. Moreover, a reciprocatory or other movement of the clamping device, in effecting the clamping and releasing of the film, tends to produce air cushion effects of the film, which are imposed upon the film, tending to cause the film to bulge or bend outwardly in the portion thereof lying over the plate aperture.

These are some of the defects and objections which my invention is designed to obviate and overcome, and I will now describe various structures, features and devices which I have incorporated in overcoming and eliminating the defects mentioned.

I will first describe the film centering devices for securing accurate and uniform registration of the film in the aperture opening, referring particularly to Figs. 15, 16, 19 and 20.

The film is indicated at 124, at the point where it occupies a position in the aperture plate. The edge portions of the film are received against suitable surfaces of the aperture plate. The aperture plate 125 is provided with perforations 126 at opposite sides thereof, over or across which apertures the usual perforations in the edges of the film pass. In order to effectively position and adjust the film uniformly with relation to the aperture plate I provide registering or centering pins 127. The registering pins 127 are preferably pointed or tapered so as to easily enter the film perforations and thence pass on into the openings 126 in the aperture plate. In this way, the position of the film is accurately, efficiently and uniformly positioned and adjusted in the aperture plate across the aperture. The centering or registering pins 127 may be shifted or moved into and out of film registering position in many different ways. I have shown a simple arrangement wherein said pins are carried in a frame 128 which is suspended to rock about the axis of a supporting shaft member 129, see Figs. 19 and 20. The frame 128 is provided with a pin 130 carrying a roller 131, which roller is arranged to operate within a cam slot 132 formed in a rotatively driven member 133. This cam member is mounted upon shaft 134, whereby it is driven when said shaft is rotated. The shaft 134 may be driven from any convenient rotating part of the apparatus. A simple drive gearing arrangement is shown wherein the said shaft is driven through intermeshing gears 135 respectively carried by shafts 48 and 134.
If desired, and as shown, a balance wheel 136 may be mounted upon shaft 134 to secure steadiness of the operation thereof.

When shaft 134 is rotated the swinging frame 128 carrying the register pins 127 is rocked or swung about the axis of the shaft 129, from which said frame is suspended, by the engagement of the roller in the cam slot 132. In this manner vibratory movement is imparted to the frame 128, causing the register pins 127 to periodically advance into and through the film perforations and thence into the openings 126 in the aperture frame, thereby accurately adjusting and registering in uniform position and relation the film for each exposure. Thus any variation in the position of the film with relation to the aperture due, for example, to any uneven action of the intermittent sprocket, is compensated by the centering action of the register pins when projected through the film perforations. It will be understood that uneven action exerted upon the film of the intermittent sprocket will cause the perforations in the film to fail to properly register with the centering pins, and hence said pins when moved towards their centering position in engagement in the film apertures are liable to injure the perforations, or even to punch new perforations in the film. This would greatly impair the efficiency of the feed of the film and the engagement of its perforations upon the teeth of the sprocket and also is liable to cause an unsteady picture to be made. To avoid this difficulty I provide an adjustment for the frame 128, whereby the position of the pins may be raised or lowered. To this end said frame 128 is carried by a sleeve 137, see Fig. 19, within which sleeve is mounted a second eccentric sleeve 138, which latter sleeve is mounted directly upon the shaft 129.

Figure 17:
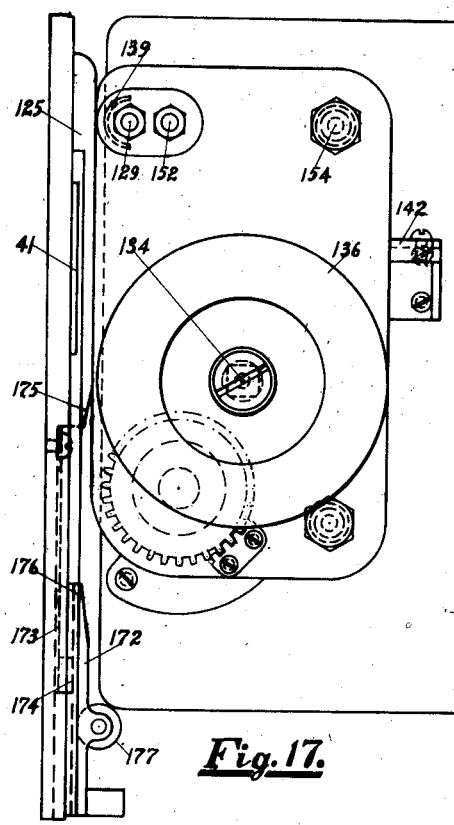
Fig. 17 is a detailed view in elevation of the movement box with the front plate of the camera casing removed.
Figure 18:
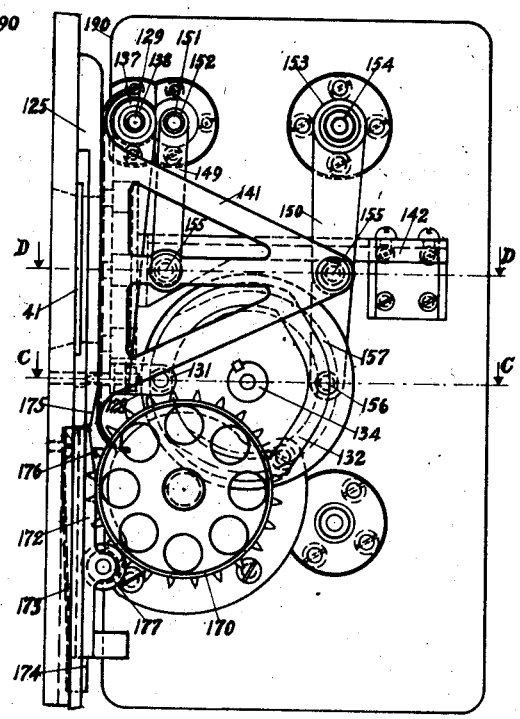
Fig. 18 is a similar view with the front plate of the movement casing removed.
Figure 19:
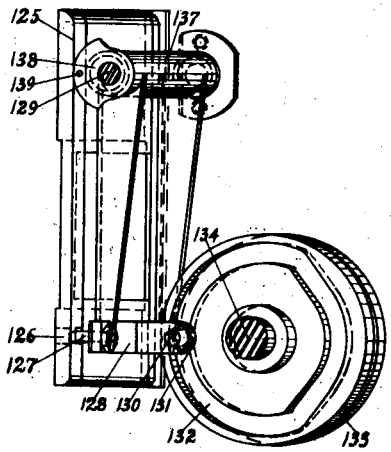
Fig. 19 is a detailed view in isometric perspective, illustrating the structure and mounting of the film registering devices and their actuating cams.
Figure 20:
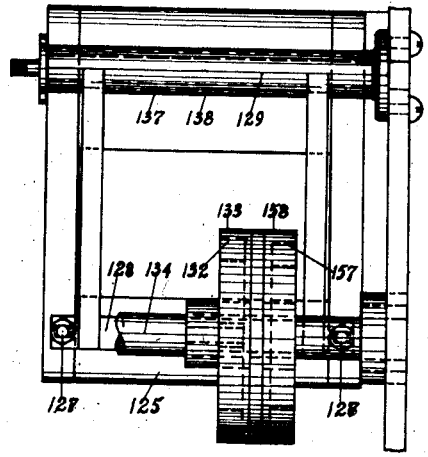
Fig. 20 is a view in rear elevation of the structure shown in Fig. 19.

By rotatively moving the eccentric sleeve 138 upon shaft 129 the sleeve 137 which carries the pin frame 128 is adjusted, as will be clearly understood by referring to Figs. 18 and 19. The slot and pin arrangement indicated at 139, Fig. 17, affords means for effecting the rotative adjustment of the eccentric sleeve 138.

In order to still further guard against any injury to the film perforations by the action of the centering pins, I propose to provide a surplus of length of film between the line of action of the centering pins and approximately the horizontal plane through the axis of the intermittent sprocket. To accommodate this surplus length of film the lower edge of the aperture plate 125 is cut away or beveled outwardly, as shown at 175, Figs. 17 and 18, and the upper edge of the guide plate 172 is likewise cut away or beveled as at 176. By adjusting the centering pins, as above described, so that their pointed ends will enter the film perforations at a point nearer the lower edges of said perforations than the upper edges thereof, the film will be drawn or pulled downwardly by the pins a very short distance thereby producing the surplus of film length referred to. This also prevents the centering pins from being forced through the perforations in off-center relation, thereby enlarging or tearing the perforations, as well as avoiding the possibility of the pins forming new perforations in the film, resulting in either case in injuring the film or losing uniform registration of consecutive pictures.

I will now describe one arrangement embodying my invention for clamping and holding the film in position after it has been properly centered by the centering and register pins above referred to.

One of the objects sought to be accomplished is to clamp and hold and maintain the film in absolutely fixed rigid position during the period of exposure thereof in the taking of pictures, and to prevent any outward bulging or movement of the film when in its clamped position during exposure. These results are exceedingly important in order to avoid the possibility of impairing the pictures. This is particularly true where films of extra width, or pictures of extra size, are taken in the use of the camera for motion picture purposes.

Figure 16:
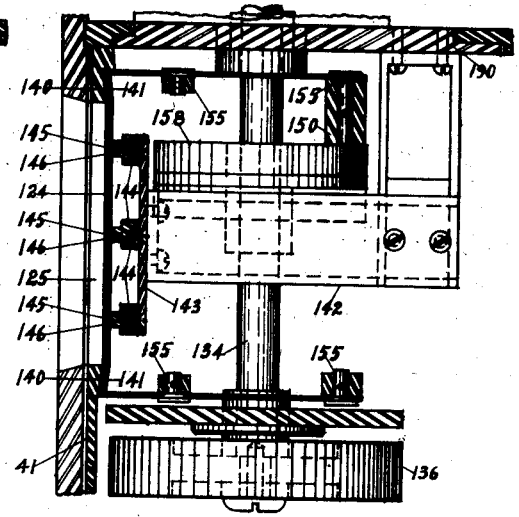
Fig. 16 is a view in section on the line D, D, Fig. 18, looking in the direction of the arrows.
Figure 24:
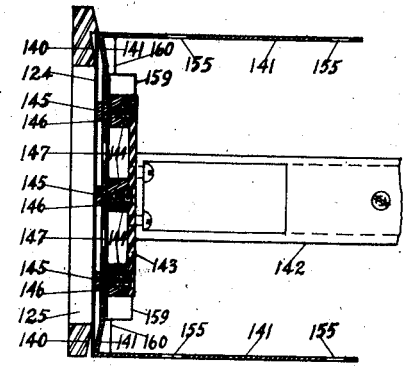
Fig. 24 is a view similar to Fig. 23, illustrating the film plate, the film, and clamping plate, the latter in displaced relation with respect to its clamping position.

In carrying out my invention in the particular manner shown, see Figs. 15, 16, 18, 21, 22, 23, 24, 25 and 26, the side edges of the film are forced against inclined surfaces 140, see Figs. 15 and 16, 23, and 24, constituting the edge borders of the aperture in the aperture plate 125. When the edges of the film are clamped against the inclined surface 140 by means of the clamp plate 141, a slight bend outwardly is imparted to the film edges. The clamping edges of the clamp plate 141 are inclined to correspond with the inclined surfaces 140 in the aperture plate 125. The central portion of the clamp plate, that is, the portion thereof which covers the aperture, is flat. By reason of the bends thus formed in the edges of the film a pressure is exerted upon that portion of the film which covers the aperture, which would tend to bulge it inwardly, thereby preventing any tendency to bulge the film outwardly. Since, however, the film or the central portion thereof opposite the aperture, is engaged on its inner side by the flat portion of the clamp plate 141, any bulging inwardly of the film is prevented. In other words, the bending of the edges of the film imposes a stress or strain inwardly on the film, as indicated by the arrows on Fig. 23, but such inward bulging of the film is prevented, and hence the film is held uniformly in a straight plane across the aperture by the central portion of the clamp plate. Stationarily mounted upon a suitable bracket 142, see Fig. 24, is mounted a plate 143. Carried by this plate 143 are a series of buttons 144, having reduced ends 145 disposed opposite holes or openings indicated at 146 in the clamp plate 141. The reduced ends 145 of the buttons protrude through the openings 146 of the clamp plate when the latter is withdrawn from its clamping position. When, however, the clamp plate 141 is advanced into film clamping and holding position, the film or the portion thereof across the aperture, lies flat against the flat central portion of the clamp plate. In this clamping position, as shown in Fig. 16, the clamp plate just clears the reduced ends 145 of the button. By reason of this arrangement the film, while in movement under the action of the intermittent sprocket, is prevented from rubbing against the clamp plate and hence the danger of scraping or injuring the film by frictional contact with the clamp plate is avoided.

Figure 26:
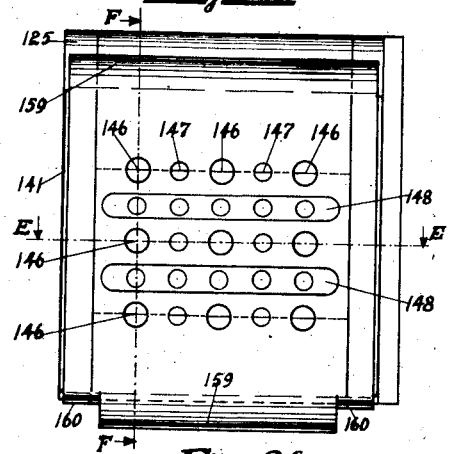
Fig. 26 is a view in rear elevation of the clamping plate.

It is important to prevent any air to be trapped between the rear surface of the film and the front surface of the clamp plate 141 which is brought into supporting and holding contact with the film. Since a rapid periodic motion is imparted to the film clamp plate in the operation of the apparatus, more or less of an air pump action is created, which, unless prevented, would tend to form an undesirable air cushion between the film and the clamp plate tending to impose an outward stress upon the film to bulge it outwardly thereby impairing or destroying the proper focussing of the picture, particularly in the middle portion of the picture. The holes 146 which receive the ends of the buttons 144, serve also the purpose of preventing the formation of such air cushion action. To insure the elimination of air cushion between the film and its clamp plate, additional holes 147, see Fig. 26, are formed in the clamp plate.

Figure 25:
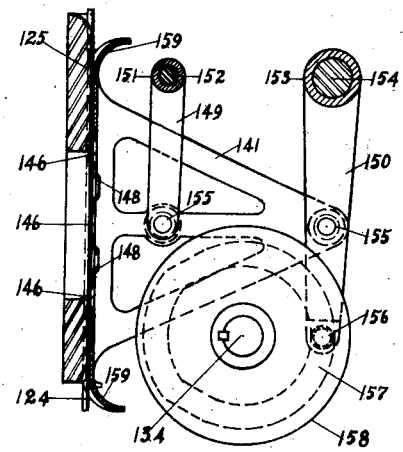
Fig. 25 is a similar view in section on the line F, F, Fig. 26, looking in the direction of the arrows, showing the clamping plate in clamping position and the actuating mechanism therefor.

If desired the surface of the clamp plate may be corrugated transversely as indicated at 148, the corrugations being pressed inwardly from the outer or film engaging surface of the plate, see Fig. 25, and some of the holes 147 and formed through the bottoms of the corrugations 148. This not only serves to stiffen the body of the clamp plate, but affords additional means for preventing the trapping of air between the clamp plate and the surface of the film, the channels forming in effect passages between the perforations 147.

Figure 21:
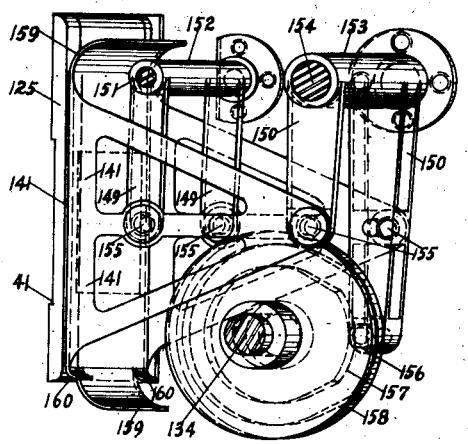
Fig. 21 is a broken detailed view in isometric perspective of the film clamping plate, its mounting and cam for actuating the same.
Figure 22:
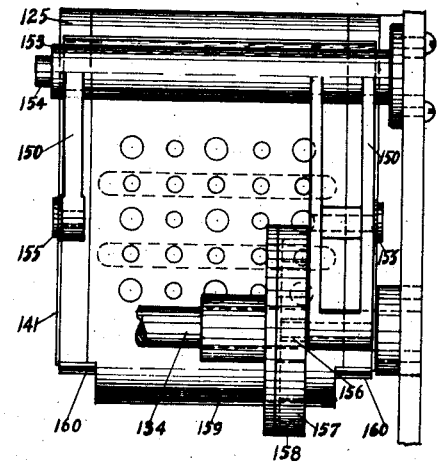
Fig. 22 is a view in rear elevation of the structure shown in Fig. 21.

The clamp plate 141 is carried by two pairs of swinging links 149, 150, see Fig. 21. The pair of links 149 are suspended from, or form part of a sleeve 152 carried by a supporting stud shaft 151, while the links 150 are carried by, or form part of, a sleeve 153 mounted upon a stud shaft 154. The lengths of the links 149, 150 from their pivoted axes 151, 154 to their points of connection 155, with the clamp plate are equal, thus constituting a parallel movement which insures the movement of the clamp plate in truly accurate parallel positions to its film clamping surfaces. One of the links 150, see Figs. 21, 22, is of increased size in order to strengthen the same, and is also extended to carry a roller 156 arranged to engage in cam slot 157, in a cam member 158, mounted on shaft 134. When the shaft 134 is rotated, swinging movement is imparted to the links 150, 149 whereby the clamp plate is moved into and out of clamping relation with respect to the film. The shaft 134 may be a part of the star drive film sprocket mechanism of the Geneva movement for the intermittent movement of the film, which is ordinarily employed in connection with the operation of motion picture machines, and which movement I do not deem it necessary to describe herein. The upper and lower edges of the clamp plate are inwardly curved, as indicated at 159, see Figs. 21 and 25, to facilitate the passage of the film through the machine. The side edges of the lower portion of the clamp plate are cut-away as indicated at 160, Fig. 26, to accommodate the sprocket wheels of the intermittent or Geneva movement.

Figure 27:
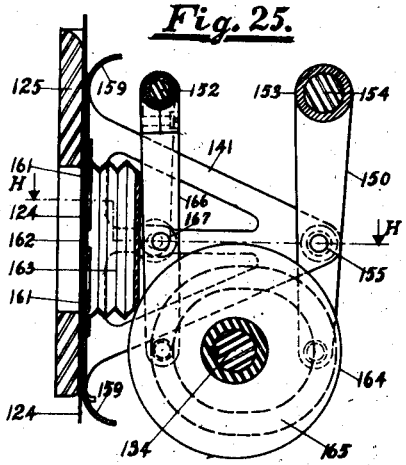
Fig. 27 is a view in section on the line G, G, Fig. 28, looking in the direction of the arrows, and showing a modified structure of clamping mechanism.
Figure 28:
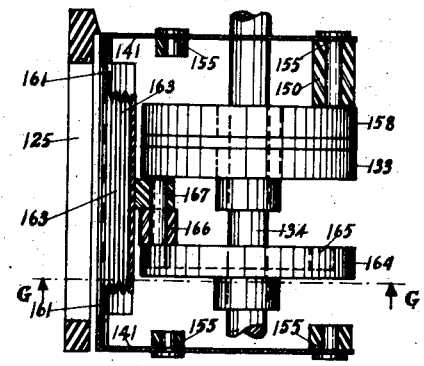
Fig. 28 is a view on the line H, H, Fig. 27, looking in the direction of the arrows.

In Figs. 27 and 28 a slightly modified arrangement for the avoidance of air pockets between the clamping plate 141 and the film is shown. In this arrangement I propose to create a vacuum to act upon the rear surface of the film to draw the same tightly and flatwise against the outer surface of the clamp plate, thereby preventing any outer bulging of the film. In this form the edges of the film are not clamped against inclined surfaces, such as shown at 140, Figs. 23, 24, but are clamped flatwise against the surface of the edges of the aperture plate 125. In the modified arrangement shown, the clamp plate, or the surface thereof against which the rear surface of the film lies, is flat, but is slightly depressed in the portion of the area thereof which lies over the aperture, as indicated at 161, see Figs. 27 and 28. A transverse rib 162 is formed in the clamp plate. This rib is pressed outwardly from the depressed portion 161 of the plate, and makes bearing contact against the central portion of the rear surface of the film. A bellows pump indicated at 163 is employed to create a vacuum at the rear of the film, and of the film clamping portion of the plate, that is, inwardly of the depressed portion 161 of the clamping plate. The clamping plate is perforated so that the vacuum action created by the bellows may be exerted upon the surface of the film. The bellows may be actuated in any suitable or convenient way. A simple arrangement is shown wherein a cam member 164 is mounted upon shaft 134, and, in a cam slot 165 of said member operates a roller carried by an arm 166 connected to the bellows as at 167. From this description it will be seen that the depression in the clamp plate forms, in effect, a suction chamber on which the bellows acts. In fact, the transverse rib 162 makes two suction chambers separated from each other by said rib.

In the film clamping arrangement hereinbefore described the tendency of the film, or the portion thereof which covers the aperture, to bulge outwardly, is counteracted by forming longitudinal bends outwardly at the side edges of the film when clamped to the aperture plate.

Figure 30:
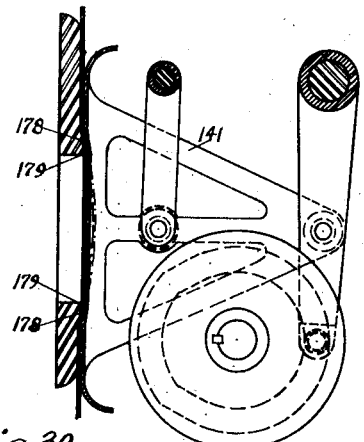
Fig. 30 is a detail view similar to Fig. 25 showing a slightly modified form of aperture and clamp plates.

This outward bulging tendency may be overcome in many other ways. In Fig. 30 I have shown an arrangement wherein a tension or stress is imposed on the film, tending to bulge it inwardly by forming transverse bends in the film above and below the aperture. To accomplish this the upper and lower borders of the aperture are slightly recessed outwardly, as indicated at 178, leaving a slightly raised edge portion 179 over which the film is slightly bent when the clamp plate is clamped up, the said clamp plate being shaped on its outer surface to conform to the recessed and rib edge portions of the aperture plate. This results in slightly bending the film transversely above as well as below the aperture thereby creating a tension or stress in the portion of the film which covers the aperture tending to overcome and counteract any outward bulging of the film.

Figure 31:
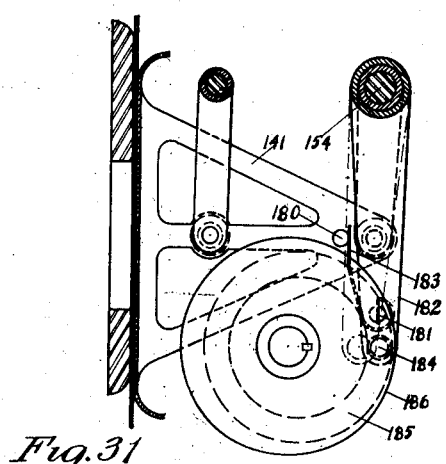
Fig. 31 is a similar view showing means to apply a variable pressure in the operation of the clamp plate.

The successive rapid movements of the film clamp plate to clamp and release the film, sixteen per second, tends to cause a slamming action and to create an objectionable banging noise. It is exceedingly desirable to prevent this. I propose to accomplish the desired result by maintaining a yielding pressure upon the clamp plate tending to hold or press said plate into or towards clamping position and merely relieving or increasing said pressure to release or to clamp and hold the film, said pressure being relieved to permit the intermittent feed of the film, and increased to effect the clamping of the film for exposure. In Fig. 31 I have shown one arrangement for accomplishing the desired result, wherein I mount a stud 180 on the clamp plate 141, and another stud 181, on the end of a cam lever 182. This cam lever is a separate member from the links 150 although it may be suspended from the same supporting stud 154, hereinabove described. I engage one end of a spring 183 against the stud 180, and the other end against stud 181 in such relation that the tension of said spring intermediate said studs is exerted upon the clamp plate tending to press the latter into or towards clamping position. In this case swinging movements of the cam lever 182 effected by the action of the roller 184 in the cam slot 185 of cam member 186, merely serve to increase or decrease the tension exerted by the spring, upon the clamp plate. Consequently there will be no slamming nor banging noise in the operation of the film clamp plate.

The necessity sometimes arises for employing a wide angle short focus lens to cover a given size aperture of a camera. In such case in order to render the focus of the picture on the film uniform throughout, and to secure a desired degree of sharpness and clearness of the picture as a whole, it is desirable to compensate for the curvature of the field of the lens. To accomplish this I propose to employ a film clamping plate the surface of which is curved to correspond to the radius of curvature of the lens field, the opposed surface of the aperture plate, of course, being correspondingly shaped to conform to the curvature of the film clamp plate.

Figure 29:
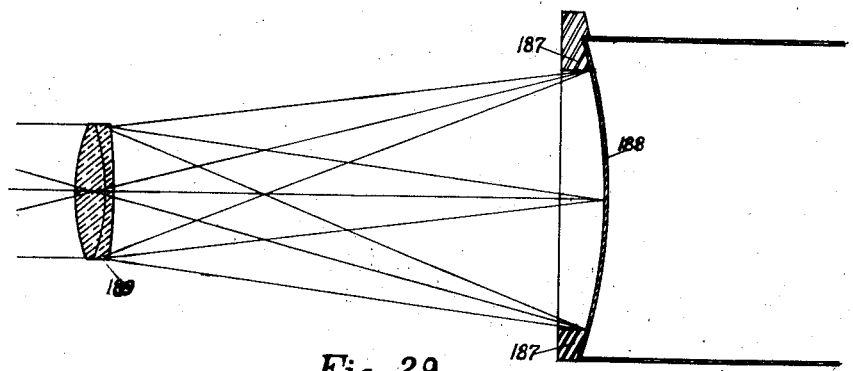
Fig. 29 is a view in horizontal section illustrating diagrammatically the compensation for the curvature of field of the lens system.

I have illustrated this idea in Fig. 29, wherein the surfaces of the border edges of the aperture plate are curved, as at 187, to conform to the radius of the curvature of the lens field, and the surface of the clamp plate 188 is curved to the same radius of curvature, a lens of wide angle and short focus being indicated at 189.

It is desirable to supply some sort of indication on the film to indicate the beginning or end of any particular scene. To accomplish this result I propose to employ a suitable indicating device and dispose the same at a convenient position in the path of feed of the film, whereby a permanent mark or stamp may be cut or otherwise produced or stamped on the edge of the film. A simple arrangement is shown wherein a plunger 168 is spring pressed outwardly by coil spring 169. The inner end of said plunger carries a coating or stamping die, past which the film (see Fig. 8) feeds from the main sprocket towards the take-up reel. By simply pressing the plunger 168 inwardly the desired indication is made.

It is desirable to accurately and nicely adjust the film clamping plate with relation to the aperture plate. Difficulties and complications however are encountered in attempting to adjust the clamp plate toward and from the aperture plate, for the reason that such adjustments would cause disarrangement of the relation of the clamp plate to its actuating mechanism. I propose to avoid these difficulties and complications and to secure the desired adjustment of the clamp plate towards and from the aperture plate, by maintaining the clamp plate support as well as its entire actuating mechanism upon a common carrier, and I secure the desired adjustment by adjusting said common carrier. A structure embodying this feature of my invention is shown in Figs. 8, 9, 10, 15, 16, 17 and 18, wherein the clamp plate supports and its actuating mechanism as well as the film actuating mechanism, are shown carried by a carrier member 190. This carrier member is mounted for slight relative movement within the walls or partitions of the camera case. The desired adjustment of this carrier member is accomplished by means of sets of adjusting screws 191, at the top and bottom of the carrier member 190. These screws are tapped through blocks 192, mounted upon the camera case or partition, and engage studs 193, secured to the carrier member 190. In this manner I am enabled to secure accurate adjustment of the clamp plate with relation to the aperture plate without causing any disarrangement of the actuating mechanism for the said plate or that for the film feed. It will be understood, of course, that such adjustment is very minute and not sufficient to affect the proper mesh of the gearing 135.

From the foregoing description it will be seen that I provide an exceedingly simple camera mechanism, particularly well adapted for taking motion pictures, and specially adapted for handling films of extraordinary size and width, whereby each individual picture may be of larger size or area than pictures heretofore ordinarily employed in motion picture work, thereby greatly enlarging the visibility of the pictures, when projected onto a screen for display.

It will also be seen that I provide an exceedingly simple and efficient and controllable shutter operating mechanism, and various other features, which I have hereinbefore described and set forth. It will be understood, of course, that variations and changes in the details of construction and arrangement of parts may readily occur to those skilled in the art and still fall within the spirit and scope of my invention, but having now set forth the objects and nature of my invention and structures embodying the principles thereof, what I claim as new and useful and of my own invention is:

1. In a camera, means to center the film in the aperture opening of the camera including an aperture plate having openings to register with the perforations in the edges of the film, centering pins to enter said registering openings and serving to center the film in the aperture, a vibratory frame carrying said pins, means for vibrating said frame, means to adjust the position of said frame to insure proper registration of the pins and registering openings, a shaft upon which said vibratory frame is suspended, an eccentric sleeve carried by said shaft, and a sleeve mounted upon the eccentric sleeve connected to said frame whereby by adjusting said eccentric sleeve the position of the pins carried by the vibratory frame may be adjusted to proper registering relation with said openings.

2. In a camera, a film feeding mechanism, an aperture plate, and a solid clamp plate to clamp the film against the aperture plate to hold the same steady and rigid during the period of exposure, the clamp and aperture plate having cooperating inclined edge surfaces to slightly bend the edges of the film to prevent outward bulging of the film away from the clamp plate during exposure.

3. In a camera, film feeding devices, an aperture plate and a solid clamp plate cooperating therewith, said clamp plate having openings therethrough, and buttons arranged in line with said openings and operating therethrough when said clamp plate is withdrawn from clamping relation with respect to the film.

4. In a camera, film feeding devices, an aperture plate, a clamp plate cooperating therewith, actuating mechanism for the clamp plate, a frame carrying said clamp plate and its actuating mechanism, studs carried by said frame and adjusting devices carried by the camera casing and arranged to indicate said studs whereby the position of the frame and of the clamp plate carried thereby may be adjusted with relation to the aperture plate.

5. In a camera, means to center the film in the aperture openings of the camera including an aperture plate having openings to register with the film perforations in the edges of the film, centering pins to enter said registering openings and serving to center the film in the aperture, a rock frame suspended from above the aperture on which said pins are carried, a channeled cam, a direct connection between the channeled cam and the rock frame, a shaft on which said cam is mounted and a flywheel carried by said shaft to effect uniform rotation of the cam.

6. In a camera, means to center the film in the aperture opening of the camera including an aperture plate having openings to register with the perforations in the edges of the film, centering pins to enter said registering openings and the film perforations when the film is at rest, a pivotally supported vibratory frame carrying said pins, means directly connected to said frame to effect positive movement of said frame in both directions, and means to adjust the vibratory frame longitudinally of the aperture plate to insure proper registration of the pins and registering openings.

7. In a camera, film feeding devices, an aperture plate and a clamp plate cooperating therewith to clamp and hold the film rigidly in position during exposure, and means for actuating said clamping plate in unison with the operation of the film feeding devices, said aperture plate and clamping plate having cooperating inclined edge portions to impart an outward bend to the edges of the film to prevent outward bulging or movement of the central area of the film when in its clamped position during exposure.

8. In a camera, film feeding devices, a fixed aperture plate and a clamp plate cooperating therewith, supports and actuating mechanism for the clamp plate, and a common carrier for said supports and actuating mechanism, and means to adjust said supports longitudinally with relation to the aperture plate.

PER JOHAN BERGGREN.